United States Patent [19]

Hasegawa et al.

[11] Patent Number: 5,435,364
[45] Date of Patent: Jul. 25, 1995

[54] PNEUMATIC RADIAL TIRE WITH FOUR MAIN GROOVES

[75] Inventors: Hirotsugu Hasegawa, Kakogawa; Yutaka Kuroda; Nobuaki Minami, both of Kobe, all of Japan

[73] Assignee: Sumitomo Rubber Industries, Ltd., Kobe, Japan

[21] Appl. No.: 80,128

[22] Filed: Jun. 23, 1993

Related U.S. Application Data

[63] Continuation-in-part of Ser. No. 804,709, Dec. 11, 1991, abandoned.

[30] Foreign Application Priority Data

Dec. 28, 1990 [JP] Japan .................. 2-415943

[51] Int. Cl.$^6$ ............ B60C 101/00; B60C 103/04; B60C 111/00
[52] U.S. Cl. ............ 152/209 R; 152/209 A; 152/209 D
[58] Field of Search .......... 152/209 R, 209 B, 209 D, 152/209 A; D12/145–151

[56] References Cited

U.S. PATENT DOCUMENTS

| | | | |
|---|---|---|---|
| D. 320,772 | 10/1991 | Hasegawa ............ | D12/147 |
| D. 320,969 | 10/1991 | Kobayashi et al. ............ | D12/147 |
| D. 330,882 | 11/1992 | Hasegawa ............ | D12/147 |
| D. 342,047 | 12/1993 | Takahashi ............ | D12/146 |
| 4,057,089 | 11/1977 | Johannsen ............ | 152/209 R |
| 4,456,046 | 6/1984 | Miller ............ | 152/209 R |
| 4,676,290 | 6/1987 | Tausei et al. . | |
| 4,700,762 | 10/1987 | Landers ............ | 152/209 R |
| 4,884,607 | 12/1989 | Mori ............ | 152/209 R |
| 5,152,852 | 10/1992 | Hisamichi et al. ............ | 152/209 R |

FOREIGN PATENT DOCUMENTS

| | | | |
|---|---|---|---|
| 0299766 | 1/1989 | European Pat. Off. . | |
| 60-169305 | 9/1985 | Japan . | |
| 214905 | 1/1990 | Japan . | |
| 2081773 | 3/1990 | Japan ............ | 152/209 B |
| 4208606 | 7/1992 | Japan ............ | 152/209 B |
| 2093777 | 9/1982 | United Kingdom . | |

Primary Examiner—Steven D. Maki

[57] ABSTRACT

A pneumatic radial tire comprises four main grooves, shoulder lateral grooves (g1L, g1R), middle lateral grooves (g2L, g2R) and central lateral grooves (g3L, g3R); the central lateral grooves (g3L) on one side of the tire equator being circumferentially shifted from the central lateral grooves (g3R) on the other side of the tire equator; the middle lateral grooves (g2L, g2R) shifted from the central lateral grooves (g3L, g3R) towards a circumferential direction (D); the shoulder lateral grooves (g1L, g1R) shifted from the middle lateral grooves (g2L, g2R) towards the circumferential direction (D); the total (WG) of the axial widths (WG1, WG2) of the four main grooves being 0.25 to 0.32 times the ground contacting area width (W); on each side of the tire equator, the width (W) and the total (LG1+LG2) of the axial length (LG1) measured from the ground contacting area edge (SE) to the axially inner edge of the shoulder rib (RS) and the axial length (LG2) measured from the ground contacting area edge (SE) to the axially inner edge of the middle rib (RM) satisfying the following relation: $0.44 \leq (LG1+LG2)/W \leq 0.50$.

13 Claims, 4 Drawing Sheets

PNEUMATIC RADIAL TIRE WITH FOUR MAIN GROOVES his application is a continuation-in-part of application Ser. No. 07/804,709 filed on Dec. 11, 1991, now abandoned.

The present invention relates to a pneumatic radial tire, of which wet grip performance is improved without deteriorating low noise characteristic, especially suitable for passenger car.

BACKGROUND OF THE INVENTION

In general, a tire is provided with tread grooves for drainage to thereby improve wet grip performance. Such a water-draining function is very important under high speed running, and the recent high-performance cars require a further improved wet grip performance.

However, the tread grooves make noise, and means of improving the wet grip performance generally increase noise level.

To solve those contradictory problems, in Japanese Patent Application Jr-A-02-14905, a block pattern is disclosed, wherein the tread is provided in the ground contacting area with straight grooves inclined at an acute angle of 15 to 40 degrees with respect to the circumferential direction of the tire. However, due to the small inclination angle, the tread rigidity is low, and steering stability is not good, and further wet grip is low.

SUMMARY OF THE INVENTION

It is, therefore, an object of the present invention to provide a pneumatic radial tire, in which wet grip performance and low noise performance are improved at the same time without deteriorating the steering stability.

According to one aspect of the present invention, a pneumatic radial tire has a rib-block type tread pattern and comprises a tread being provided with four main grooves extending continuously in the circumferential direction of the tire being arranged symmetrically with respect to the tire equator so as to divide the tread into five ribs, the four main grooves consisting of a pair of axially inner main grooves (G2) being disposed one on each side of the tire equator and a pair of axially outer main grooves (G1) being disposed one between each tread edge and each inner main groove, each shoulder rib (RS) between the outer main groove and the tread edge being provided with shoulder lateral grooves (g1L, g1R) extending from the outer main grooves to the tread edge so as to be divided into blocks, each middle rib (RM) between the inner main groove and the outer main groove being provided with middle lateral grooves (g2L, g2R) extending from the inner main groove to the outer main groove so as to be divided into blocks, the central rib (RC) between the two inner main grooves being provided with central lateral grooves (g3L, g3R) extending from the inner main grooves towards the tire equator and terminated in the central rib so as to provide continuity in the circumferential direction of the tire, all the lateral grooves on each side of the tire equator being inclined in the same direction but in the opposite direction to the lateral grooves on the other side of the tire equator, each of the lateral grooves (g1L, g1R, g2L, g2R, g3L and g3R) being curved so that the inclination of the groove center line thereof with respect to the tire equator gradually increases from the axially inner end to the outer end thereof, the angle ($\theta 1$) of the center line of the shoulder lateral groove (g1L, g1R) at the axially inner end being in the range of 85 to 80 degrees with respect to the tire equator (CO), the angle ($\theta 2$) of the center line of the middle lateral groove (g2L, g2R) at the axially inner end being in the range of 45 to 60 degrees with respect to the tire equator (CO), the angle ($\theta 3$) of the center line of the central lateral groove (g3L, g3R) at the axially inner end being in the range of 40 to 55 degrees with respect to the tire equator (CO), the central lateral grooves (g3L) on one side of the tire equator being circumferentially shifted from the central lateral grooves (g3R) on the other side of the tire equator, between both sides of each inner main groove (G2), the middle lateral grooves (g2L, g2R) being shifted from the central lateral grooves (g3L, g3R) towards a circumferential direction (D), between both sides of each outer main groove (G1), the shoulder lateral grooves (g1L, g1R) being shifted from the middle lateral grooves (g2L, g2R) toward the circumferential direction (D), the circumferential shifts (LS1) between the shoulder lateral grooves (g1L, g1R) and the middle lateral grooves (g2L, g2R) being 0.2 to 0.3 times the mean circumferential pitch length PM of the lateral grooves (g1L, g1R, g2L, g2R, g3L and g3R), the circumferential shifts (LS2) between the middle lateral grooves (g2L, g2R) and the central lateral grooves (g3L, g3R) being 0.3 to 0.5 times the mean circumferential pitch length PM, the circumferential shifts (LS3) between the central lateral grooves (g3L) on one side of the tire equator and the central lateral grooves (g3R) on the other side of the tire equator being 0.25 to 0.5 times the mean circumferential pitch length PM, in a state that the tire is mounted on its regular rim and inflated to its regular inner pressure and loaded with its regular tire load, the quotient (WG/W) of the total (WG) of the axial widths (WG1, WG2) of the four main grooves (G1 and G2) divided by the ground contact width (W) measured between the axial edges (SE) of the ground contacting area (S) being in the range of 0.25 to 0.32, on each side of the tire equator, the ground contact width (W) and the total (LG1+LG2) of the axial length (LG1) measured from the ground contacting area edge (SE) to the axially inner edge of the shoulder rib (RS) and the axial length (LG2) measured from the ground contacting area edge (SE) to the axially inner edge of the middle rib (RM) satisfying the following relation:

$$0.44 \leq (LG1+LG2)/W \leq 0.50.$$

DETAILED DESCRIPTION OF THE INVENTION

An embodiment of the present invention will now be described in detail in conjunction with the accompanying drawings.

Figure 1:
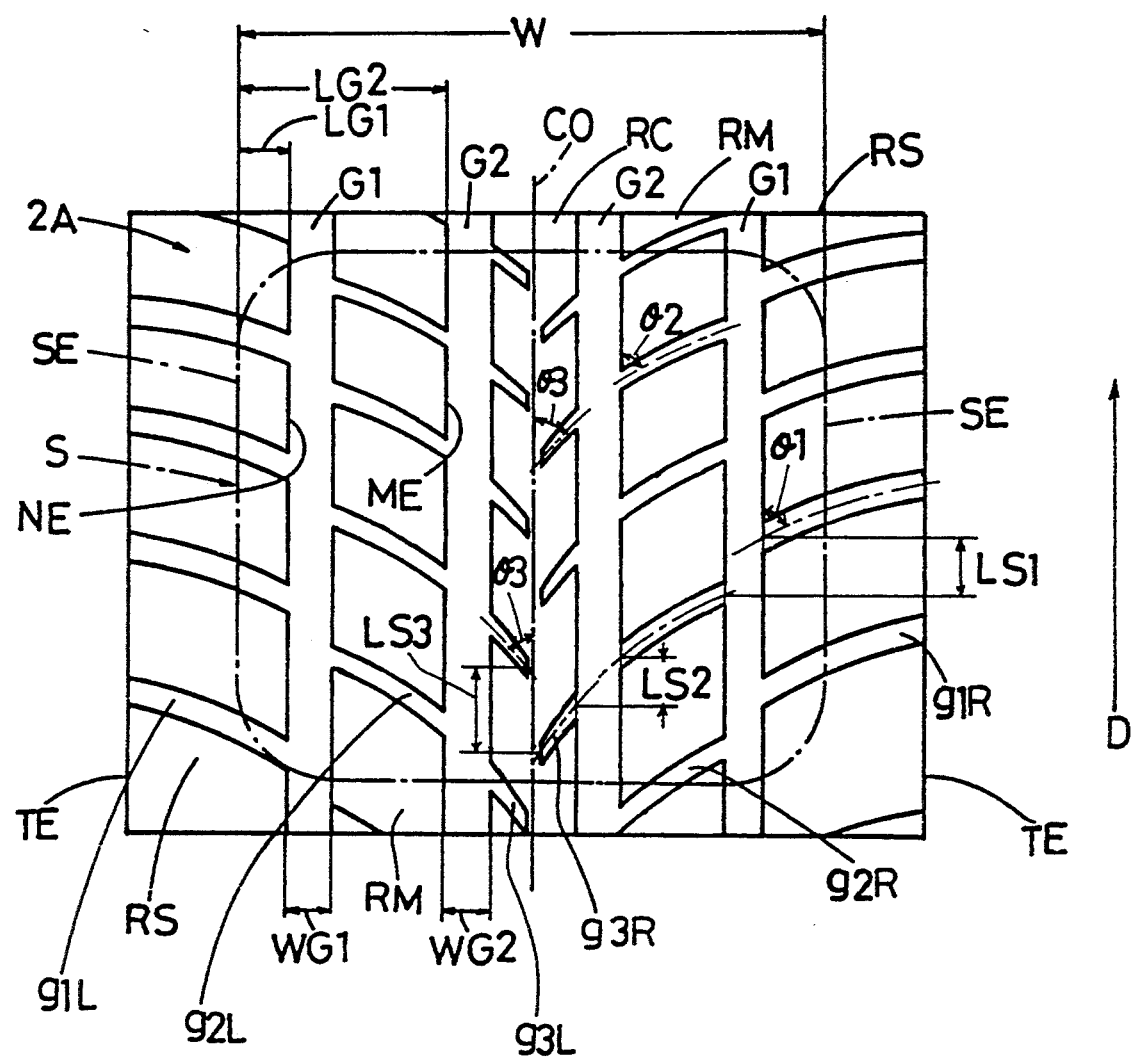
FIG. 1 is a developed plan view of a passenger car tire according to the present invention.
Figure 2:
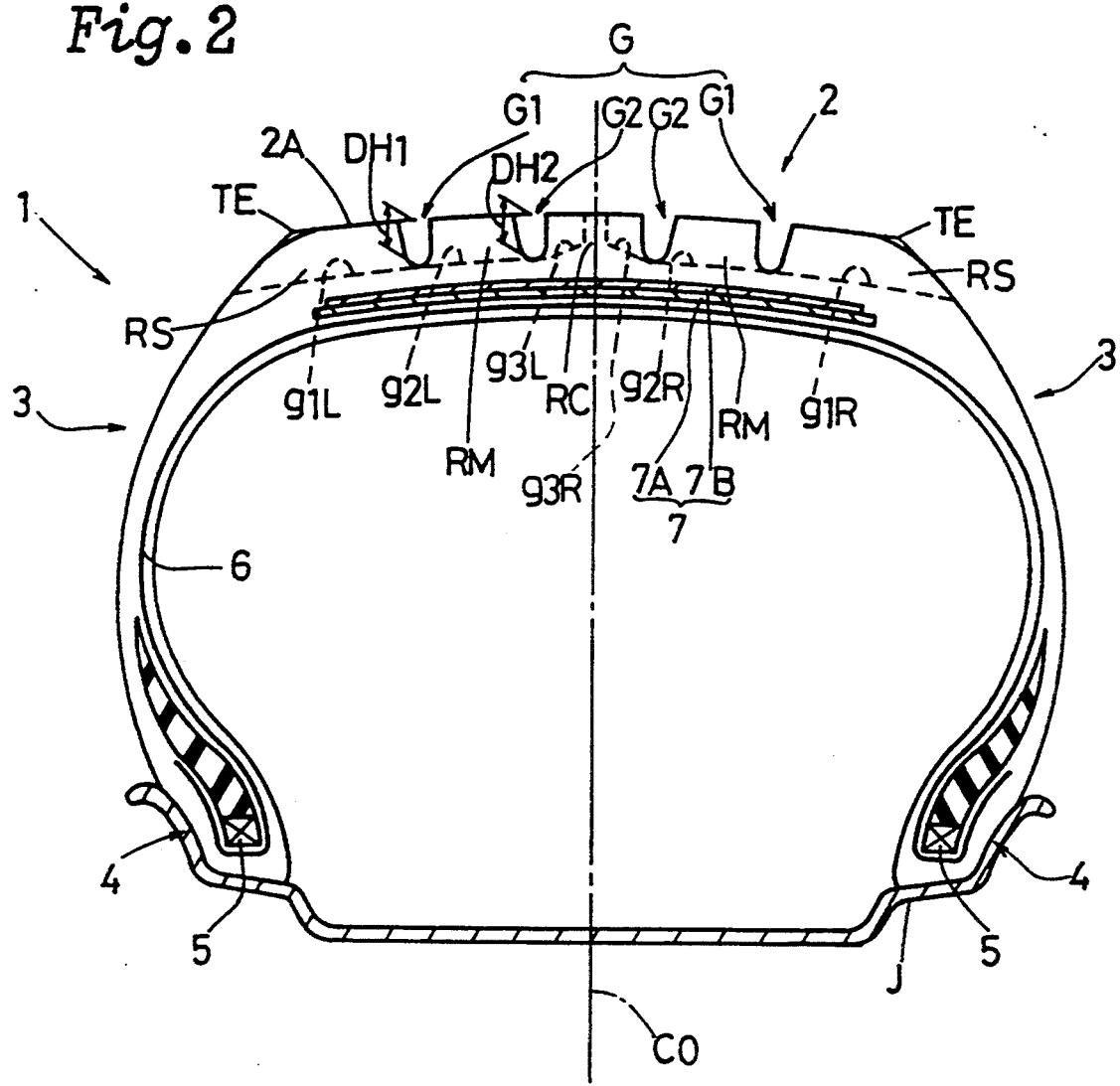
FIG. 2 is a cross sectional view thereof.
Figure 3:
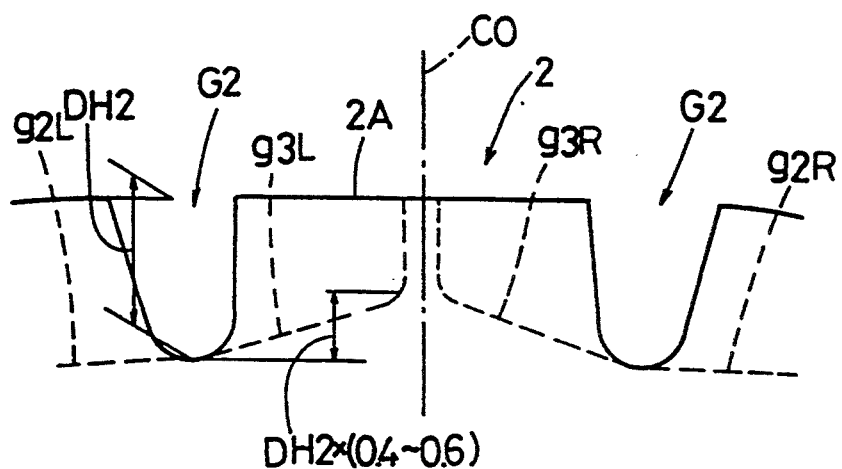
FIG. 3 is an enlarged cross sectional view of the central rib thereof.

In FIGS. 1-3, a normally inflated state of the tire 1 that the tire 1 is mounted on its regular rim J and inflated to its regular inner pressure is shown.

The pneumatic radial tire 1 has a tread portion 2 having a tread face 2A, a pair of axially spaced bead portions 4, and a pair of sidewall portions 3 extending between the tread edges and the bead portions.

The tire 1 comprises a bead core 5 disposed in each bead portion 4, a carcass 6 extending between the bead portions 4 and turned up around the bead cores 5 from the axially inside to outside thereof, and a belt 7 disposed radially outside the carcass 6 and inside the tread.

The carcass 6 comprises one or more plies, in this embodiment two plies, of cords arranged radially at an angle of 70 to 90 degrees with respect to the tire equator CO so as to provide a radial or semi-radial cord arrangement.

For the carcass cords, organic Fiber cords, e.g. nylon, polyester, aromatic polyamide and the like can be used.

The belt 7 in this embodiment comprises two cross plies 7A and 7B: a first ply 7A disposed on the the carcass 6 and a second ply 7B disposed on the First ply 7A. Each belt ply is composed of rubberized parallel cords laid obliquely with respect to the tire equator CO so as to cross the cords in the next ply.

For the first and second belt plies 7A and 7B, organic fiber cords, e.g. nylon, polyester, aromatic polyamide and the like, or steel cords are used.

The tread portion 2 is provided with a rib-block pattern comprising a central rib RC and two pairs of block rows, which is formed by four main grooves G extending continuously in the circumferential direction of the tire and lateral grooves g having two axial ends opened at a main groove or the tread edge.

The main grooves G are a pair of inner main grooves G2 disposed one on each side of the tire equator CO and a pair of outer main grooves G1 disposed one between each inner main grooves G2 and each tread edge TE. The grooves G2 and G2 and the grooves G1 and G1 are arranged symmetrically with respect to the tire equator CO.

Accordingly, by the four main grooves G, the tread portion 2 is axially divided into five circumferential parts, that is, one central rib RC between the inner main grooves G2 and G2, two middle ribs RM between the inner main grooves G2 and the outer main grooves G1, and two shoulder ribs RS between the outer main grooves G2 and the tread edges TE.

Each of the shoulder ribs RS is provided with lateral grooves (g1L, g1R). Each of the lateral grooves (g1L) and (g1R) runs completely across the shoulder rib RS from the axially outer main groove G1 to the tread edge TE so as to subdivide the rib into a circumferential row of blocks.

Each of the middle ribs RM is provided with lateral grooves (g2L, g2R). Each of the lateral grooves (g2L) and (g2R) runs completely across the middle rib RM from the axially inner main groove G2 to an axially outer main groove G1 so as to subdivide the rib into a circumferential row of blocks.

The central rib RC is also provided with lateral grooves (g3L and g3R), but it is not subdivided into blocks. Continuity in the circumferential direction of the tire is retained. The lateral grooves (g3L) and (g3R) extend from the inner main grooves G2 towards the tire equator CO, and each of them is terminated within the central rib RC at a position near and before the tire equator CO.

In this embodiment, the main grooves G are straight grooves running in parallel with the tire equator CO.

The axial widths WG1 and WG2 of the main grooves G1 and G2, respectively are limited such that the quotient WG/W of the total width WG of the four main grooves G1 and G2 divided by the ground contact width W is not less than 0.25 and not more than 0.32. Here, the ground contact width W is an axial distance measured between the axial edges SE of the ground contacting area S in the normally loaded state of the tire 1 when the tire 1 is mounted on its regular rim J and inflated to its regular inner pressure and loaded with its regular load. When WG/W is less than 0.25, drainage becomes insufficient to maintain the wet grip performance. When WG/W is more than 0.32, it becomes impossible to suppress tire noise. In this embodiment, the width WG2 is larger than the width WG1. Therefore, the total width WG=2(WG1+WG2). When WG1=WG2, WG=WG1×4=$\overline{WG2}$×4. When WG1>WG2, WG=2(WG1+WG2).

In the half tread portion on each side of the tire equator CO, the length LG2 measured axially inwardly from the above-mentioned ground contacting area edge SE to the axially inner edge ME of the middle circumferential part or rib RM, and the length LG1 measured axially inwardly from the ground contacting area edge SE to the axially inner edge NE of the axially outermost circumferential part or shoulder rib RS satisfy the following Equation 1:

$$0.88 \leq 2(LG1+LG2)/W \leq 1.00 \qquad \text{Eq. 1}$$

where W is the ground contact width. When 2(LG1+LG2)/W is less than 0.88, wet grip performance is deteriorated. When 2(LG1+LG2)/W is more than 1.00, low noise performance and rain groove performance are impaired. Here, the rain groove performance is a resistance to the disturbance of steering stability caused by the grooves provided on the road surface for wet grip. Further, the difference (LG2−LG1) of the length LG2 from the length LG1 is preferably set to satisfy the following equation 2:

$$0.42 \leq 2(LG2-LG1)/W \; 0.54 \qquad \text{Eq. 2}$$

where W is the ground contact width. If 2(LG2−LG1)/W<0.42, steering stability is lost. If 2(LG2−LG1)/W>0.54, the wet grip performance is liable to be deteriorated.

The lateral grooves (g1L), (g2L) and (g3L) on one side (left side) of the tire equator CO are inclined in the same direction, and the lateral grooves (g1R), (g2R) and (g3R) on the other side (right side) of the equator CO are inclined in the same direction but opposite to the inclination on the left side, as shown in FIG. 1. In FIG. 1, the lateral grooves (g1L), (g2L) and (g3L) on the left side of the tire equator CO have left-side-upward inclinations, and the lateral grooves (g1R), (g2R) and (g3R) on right side of the equator CO have right-side-upward inclinations. In other words, the axially outer ends of all the lateral grooves (g1L), (g1R), (g2L), (g2R), (g3L) and (g3R) are inclined towards one circumferential direction D. Therefore, water drainage is effectively promoted and the wet grip performance is effectively improved.

The groove width of the shoulder lateral grooves (g1L, g1R) is in the range of 0.25 to 0.55 times the width WG1 of the axially outer main groove G1 with which the axially inner ends of the shoulder lateral groove (g1L, g1R) are connected, and the groove width of the middle lateral grooves (g2L, g2R) is in the range of 0.25 to 0.50 times the width WG2 of the inner main groove G2 with which the axially inner ends of the middle lateral groove (g2L, g2R) are connected. In passenger car tires, inclusive of this embodiment, the groove width of the shoulder lateral grooves (g1L, g1R) is in the range of 4.0 to 6.5 mm, and that of the middle lateral grooves (g2L, g2R) is in the range of 4.0 to 6.0 mm. The width of the central lateral grooves (g3L, g3R) is larger than about 2 mm. As the inner ends of the central lateral grooves (g3L, g3R) are closed and water does not run therethrough, the groove width thereof can be smaller than the above-mentioned widths. In this example, the shoulder lateral groove width is larger than the middle lateral groove width, and the middle lateral groove width is larger than the central lateral groove width, and each width is constant through the whole groove length. However, those widths can be the same value. Further, each width can be gradually increased from the axially inner end to the outer end within the above-mentioned limitation to promote axially outward drainage.

The groove depths DH1 and DH2 of the main grooves G1 and G2, respectively are in the range of 0.06 times and 0.12 times the ground contact width W. In this embodiment, the groove depth DH1 is equal to the groove depth DH2.

The shoulder and middle lateral grooves (g1L), (g1R), (g2L) and (g2R) have the same groove depth as the main groove depths DH1 and DH2. The depth of each of the central lateral grooves (g3L and g3R) is gradually decreased from the axially outer end to the inner end thereof. The maximum depth at the outer end is equal to the depth DH2 of the inner main groove G2. The minimum depth at the inner end is such that the difference From the maximum depth is 0.4 times to 0.6 times the groove depth DH2. Therefore, the rigidity of the central rib RC is maintained and steering stability is improved without reducing drainage performance.

In this embodiment, each of the lateral grooves (g1L, g1R, g2L, g2R, g3L and g3R) is curved so that the axially outer the position, the larger the inclination angle thereof. Here, the inclination angle is defined as the angle of the groove center line with respect to the tire equator CO. The inclination angle ($\theta 1$) of the shoulder lateral groove (g1L, g1R) at the axially inner end thereof is in the range of 65 to 80 degrees. The inclination angle ($\theta 2$) of the middle lateral groove (g2L, g2R) at the axially inner end thereof is in the range of 45 to 60 degrees. The inclination angle ($\theta 3$) of the central lateral groove (g3L, g3R) at the axially inner end thereof is in the range of 40 to 55 degrees. The angle ($\theta 1$) is larger than the angle ($\theta 2$), and the angle ($\theta 2$) is larger than the angle ($\theta 3$). ($\theta 1 > \theta 2 > \theta 3$). When the angles ($\theta 1$), ($\theta 2$) and ($\theta 3$) are smaller than the respective lower limits, the corner between the lateral groove and the main groove is decreased in rigidity and moved easily, which is liable to make noise, and wear and tear of rubber are liable to occur. When the angles ($\theta 1$), ($\theta 2$) and ($\theta 3$) are larger than the respective upper limits, drainage is not improved.

The lateral grooves in each circumferential part or rib are arranged at irregular pitches P in the circumferential direction of the tire.

Between the axially adjacent ribs, the pitch arrangements are shifted. The pitch arrangement of the middle lateral grooves (g2L, g2R) is shifted from that of the central lateral grooves (g3L, g3R) toward the above-mentioned circumferential direction D. Similarly, the pitch arrangement of the shoulder lateral grooves (g1L, g1R) is shifted from that of the middle lateral grooves (g2L, g2R) toward the above-mentioned circumferential direction D. Here, the amount of the shift (LS1 and LS2) between the axially adjacent lateral grooves is defined as the circumferential distance between a lateral groove end opened at the axially inner groove wall of a main groove and a nearest lateral groove end opened at the axially outer groove wall of the same main groove, measured from the center line to the center line of those lateral grooves. Further, as an irregular pitching is employed, the mean pitch length PM (=L/NP) is defined as the whole circumferential length L of the tire measured around the tire equator CO divided by the number NP of the pitches. The number of the pitches is the same in all ribs.

The shift LS2 between the middle lateral grooves (g2L, g2R) and the central lateral grooves (g3L, g3R) is in the range of 0.3 times to 0.5 times the mean pitch length PM. The shift LS1 between the shoulder lateral grooves (g1L, g1R) and the middle lateral grooves (g2L, g2R) is in the range of 0.2 times to 0.3 times the mean pitch length PM. By such circumferential shifts, the transmittal of the noise generated in the lateral groove to the adjacent lateral groove is blocked, and the resonance of the lateral groove is suppressed, and the noise level can be reduced. If the shifts are smaller than the respective lower limits, the adjacent lateral grooves are substantially continued, and the transmittal and resonance are increased, and as a result, noise level is increased. If the shifts are larger than the respective upper limits, the drainage decreases, and wet grip performance is deteriorated.

In order to further improve the above-mentioned effects by the circumferential shifts, a shoulder lateral groove (g1R, g1L), a middle lateral groove (g2R, g2L) and a center lateral groove (g2R, g2L) are preferably staggered especially between the adjacent ends. That is, those lateral grooves are preferably arranged so as not to form a generally continuous curved configuration. In other words, a lateral groove does not extend along an extension line of the center line of the adjacent lateral groove. In this embodiment, as shown in FIG. 1, the shoulder lateral grooves (g1R, g1L) are staggered from the middle lateral grooves (g2R, g2L), but the middle lateral grooves (g2R, g2L) are not staggered from the center lateral grooves (g2R, g2L).

Further, the pitch arrangement of the central lateral grooves (g3L) on the left side of the tire equator is circumferentially shifted from the pitch arrangement of the central lateral grooves (g3R) on the right side of the tire equator. The amount of the shift LS3 between a central lateral groove (g3L) and a nearest central lateral grooves (g3R) is defined as the circumferential distance between the terminal ends of the grooves (g3L and g3R) measured from the groove center line to the groove center line. The shift LS3 is in the range of 0.25 times to 0.5 times the above-mentioned mean pitch length PM. Accompanying the shift of the central lateral grooves, the left half and the right half of the tread pattern are shifted from each other in the circumferential direction of the tire, whereby synchronization of noise from the left half and that from the right half can be avoided, and the low noise performance is further improved.

Figure 4:
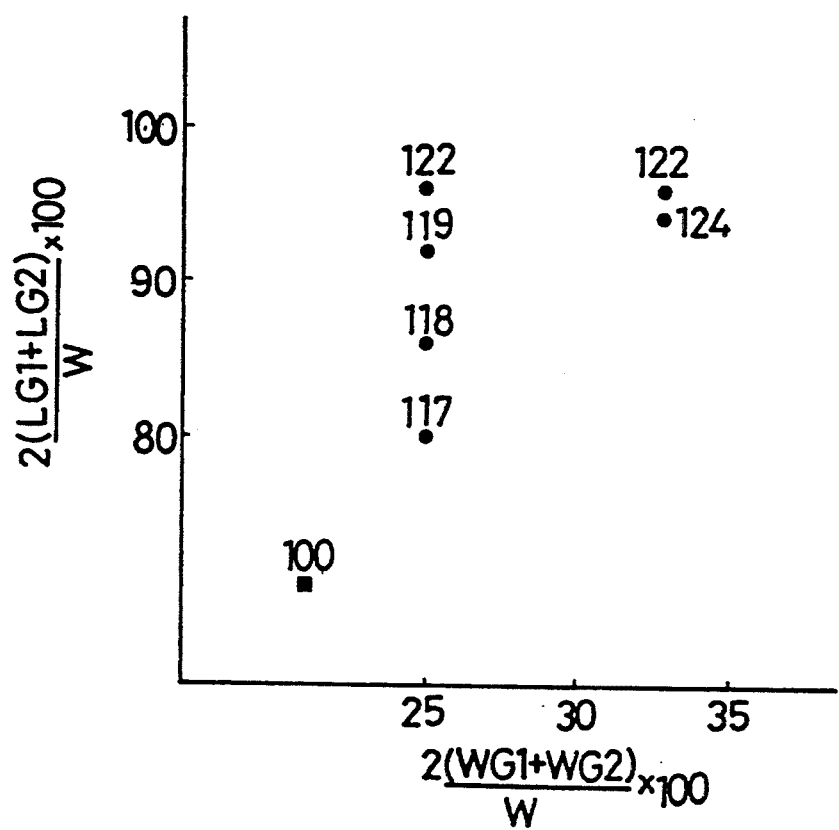
FIGS. 4 and 5 are graphs showing test results.
Figure 5:
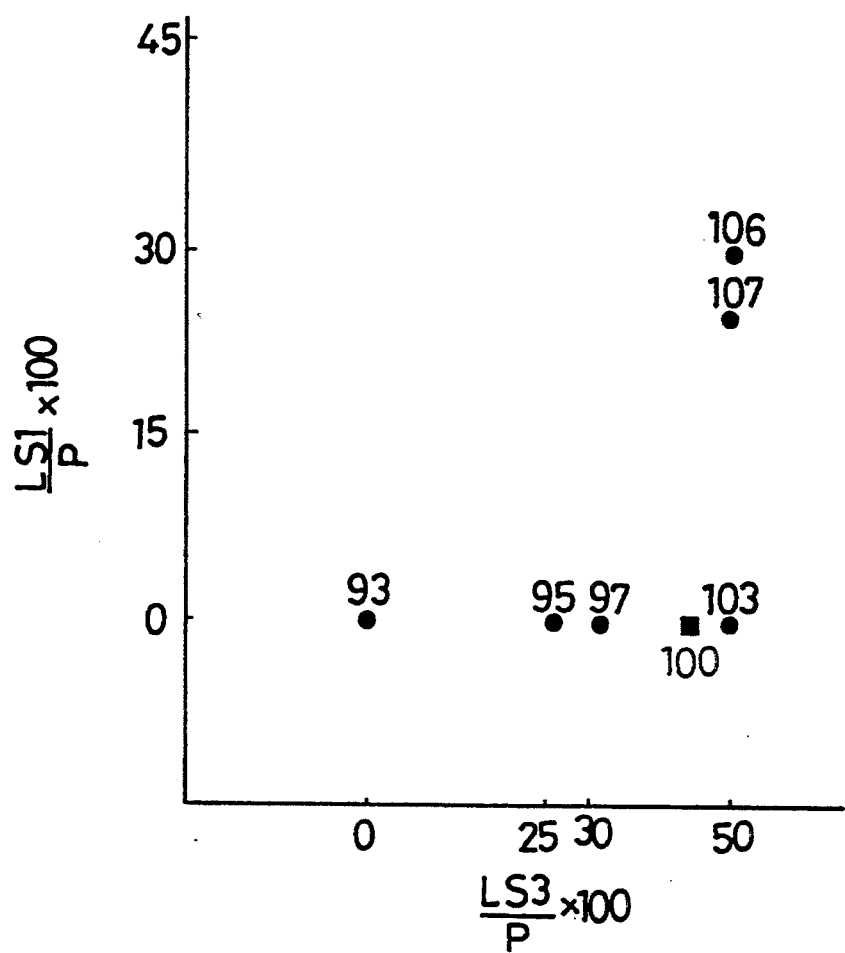

Passenger tires of size 225/50R16 having the structure shown in FIGS. 1 and 2 were prepared and tested for wet grip and tire noise. The test results are shown in FIGS. 4 and 5.

In the test tires, the main groove depth and the lateral groove depth were respectively constant, but the main grooves width, main groove position and lateral groove shift were varied.

Wet Grip Test: Using a passenger car, the critical cornering speed was measured by increasing the running speed during turning at a constant radius in a wet cornering test course. The test results are indicated in FIG. 4 by an index based on that the reference tire is 100. The larger the index, the higher the critical speed, and therefore, the better the wet grip performance.

Tire Noise Test: Using a passenger car, the noise level was measured in the interior of the car. The test results are indicated in FIG. 5 by an index based on that the reference tire is 100. The larger the index, the smaller the noise, and therefore, the better the low noise performance.

In comparison with the reference tire, the tires of the present invention were improved in wet grip performance, as shown in FIG. 4, without increasing tire noise.

Further, as shown in FIG. 5, by limiting the circumferential shifts (LS1, LS2, LS3) of the lateral grooves within the specific range, tire noise was reduced.

The invention being thus described, it well be obvious that the same may be varied in many way. Such variations are not to be regarded as a departure from the spirit and scope of the invention, and all such modifications as would be obvious to one skilled in the art are intended to be included within the scope of the following claims.

We claim:

1. A pneumatic radial tire having
   a tread being provided with four main groves extending continuously in the circumferential direction of the tire being arranged symmetrically with respect to the tire equator so as to divide the tread into five ribs, wherein said five ribs include two shoulder ribs, two middle ribs and a central rib,
   said four main grooves consisting of a pair of axially inner main grooves (G2) being disposed one on each side of the tire equator and a pair of axially outer main grooves (G1) being disposed one between each tread edge and each inner main groove,
   each shoulder rib (RS) between the outer main groove and the tread edge being provided with shoulder lateral grooves (g1L, g1R) extending from the outer main groove to the tread edge so as to be divided into blocks,
   each middle rib (RM) between the inner main groove and the outer main groove being provided with middle lateral grooves (g2L, g2R) extending from the inner main groove to the outer main groove so as to be divided into blocks,
   the central rib (RC) between the two inner main grooves being provided with central lateral grooves (g3L, g3R) extending from the inner main grooves towards the tire equator and terminated in the central rib so as to provide continuity in the circumferential direction of the tire, the inner end of each of the central lateral grooves (g3L, g3R) on each side of the tire equator terminate axially outward from the tire equator,
   all the lateral grooves on each side of the tire equator being inclined in the same direction but in the opposite direction to the lateral grooves on the other side of the tire equator,
   each of the lateral grooves (g1L, g1R, g2L, g2R, g3L and g3R) being curved so that the inclination of the groove center line thereof with respect to the tire equator gradually increases from the axially inner end to the outer end thereof,
   the angle $\theta 1$ of the center line of the shoulder lateral groove (g1L, g1R) at the axially inner end being in the range of 65 to 80 degrees with respect to the tire equator (CO),
   the angle $\theta 2$ of the center line of the middle lateral groove (g2L, g2R) at the axially inner end being in the range of 45 to 60 degrees with respect to the tire equator (CO),
   the angle $\theta 3$ of the center line of the central lateral groove (g3L, g3R) at the axially inner end being in the range of 40 to 55 degrees with respect to the tire equator (CO),
   the central lateral grooves (g3L) on one side of the tire equator being circumferentially shifted from the central lateral grooves (g2R) on the other side of the tire equator,
   between both sides of each inner main groove (G2), the middle lateral grooves (g2L, g2R) being shifted from the central lateral grooves (g3L, g3R) towards a circumferential direction (D),
   between both sides of each outer main groove (G1), the shoulder lateral grooves (g1L, g1R) being shifted from the middle lateral grooves (g2L, g2R) towards the circumferential direction (D),
   the circumferential shifts (LS1) between the shoulder lateral grooves (g1L, g1R) and the middle lateral grooves (g2L, g2R) being 0.2 to 0.3 times the mean circumferential pitch length PM of the lateral grooves (g1L, g1R, g2L, g2R, g3L and g3R),
   the circumferential shifts (LS2) between the middle lateral grooves (g2L, g2R) and the central lateral grooves (g3L, g3R) being 0.3 to 0.5 times the mean circumferential pitch length PM,
   the circumferential shifts (LS3) between the central lateral grooves (g3L) on one side of the tire equator and the central lateral grooves (g3R) on the other side of the tire equator being 0.25 to 0.5 times the mean circumferential pitch length PM, wherein
   said circumferential shifts between the shoulder lateral grooves and the middle lateral grooves and between the middle lateral grooves and the central lateral grooves (LS1 and LS2) are defined as the circumferential distance between a lateral groove end opened at the axially inner groove wall of each main groove and a nearest lateral groove end opened at the axially outer groove wall of the same main groove, measured from the center line to the center line of those lateral grooves, said circumferential shifts between the central lateral grooves on one side of the tire equator and the central lateral grooves on the other side of the tire equator (LS3) are defined as the circumferential distance between the terminal end of each central lateral groove (g3L) on one side and the terminal end of the nearest central lateral groove (g3R) on the other side measured from the groove center line to the groove center line, said mean pitch length PM is defined as the whole circumferential length (L) of the tire measured around the tire equator (CO) divided by the number (NP) of the pitches of the lateral grooves, in a state that the tire is mounted on its regular rim and inflated to its regular inner pressure and loaded with its regular tire load, the quotient (WG/W) of the total (WG) of the axial widths (WG1, WG2) of the four main grooves (G1 and G2) divided by the ground contact width (W) measured between the axial edges (SE) of the ground contacting area (S) being in the range of 0.25 to 0.32, on each side of the tire equator, the ground contact width (W) and the total (LG1+LG2) of the axial length (LG1) measured from the ground contacting area edge (SE) to the axially inner edge of the shoulder rib (RS) and the axial length (LG2) measured from the ground contacting area edge (SE) to the axially inner edge of the middle rib (RM) satisfying the following relation:

$$0.44 \leq (LG1+LG2)/W \leq 0.50, \text{ and}$$

the angle $\theta 2$ is larger than the angle $\theta 3$.

2. The pneumatic radial tire according to claim 1, wherein the groove width of the shoulder lateral grooves (g1L, g1R) is in the range of 0.25 to 0.55 times the width (WG1) of the outer main groove (G1), and the groove width of the middle lateral grooves (g2L, g2R) is in the range of 0.25 to 0.50 times the width (WG2) of the inner main groove (G2).

3. The pneumatic radial tire according to claim 1, wherein the groove width of the shoulder lateral grooves (g1L, g1R) is larger than the groove width of the middle lateral grooves (g2L, g2R).

4. The pneumatic radial tire according to claim 1, wherein each of the lateral grooves (g1L, g1R, g2L, g2R, g3L and g3R) has a constant groove width.

5. The pneumatic radial tire according to claim 1, wherein each of the lateral grooves (g1L, g1R, g2L, g2R, g3L and g3R) has a groove width increasing gradually from the axially inner edge to the outer edge thereof.

6. The pneumatic tire according to claim 1, wherein on each side of the tire equator, the ground contact width (W) and the difference (LG2−LG1) of the axial length (LG1) measured from the ground contacting area edge (SE) to the axially inner edge of the middle rib (RS) minus the axial length (LG2) measured from the ground contacting area edge (SE) to the axially inner edge of the shoulder rib (RS) satisfy the following relation:

$$0.21 \leq (LG2-LG1)/W \leq 0.27.$$

7. A pneumatic radial tire having
a tread being provided with four main groves extending continuously in the circumferential direction of the tire being arranged symmetrically with respect to the tire equator so as to divide the tread into five ribs, wherein said five ribs include two shoulder ribs, two middle ribs and a central rib, said four main grooves consisting of a pair of axially inner main grooves (G2) being disposed one on each side of the tire equator and a pair of axially outer main grooves (G1) being disposed one between each tread edge and each inner main groove, each shoulder rib (RS) between the outer main groove and the tread edge being provided with shoulder lateral grooves (g1L, g1R) extending from the outer main groove to the tread edge so as to be divided into blocks, each middle rib (RM) between the inner main groove and the outer main groove being provided with middle lateral grooves (g2L, g2R) extending from the inner main groove to the outer main groove so as to be divided into blocks, the central rib (RC) between the two inner main grooves being provided with central lateral grooves (g3L, g3R) extending from the inner main grooves towards the tire equator and terminated in the central rib so as to provide continuity in the circumferential direction of the tire, each of the central lateral grooves (g3L, g3R) being gradually decreased in depth from the axially outer end to the inner end thereof so as to provide the maximum depth at the axially outer end and the minimum depth at the axially inner end, and the difference between the maximum depth and the minimum depth is 0.4 to 0.6 times the depth (DH2) of the inner main groove (G2), all the lateral grooves on each side of the tire equator being inclined in the same direction but in the opposite direction to the lateral grooves on the other side of the tire equator, each of the lateral grooves (g1L, g1R, g2L, g2R, g3L and g3R) being curved so that the inclination of the groove center line thereof with respect to the tire equator gradually increases from the axially inner end to the outer end thereof, the angle $\theta 1$ of the center line of the shoulder lateral groove (g1L, g1R) at the axially inner end being in the range of 65 to 80 degrees with respect to the tire equator (CO), the angle $\theta 2$ of the center line of the middle lateral groove (g2L, g2R) at the axially inner end being in the range of 45 to 60 degrees with respect to the tire equator (CO), the angle $\theta 3$ of the center line of the central lateral groove (g3L, g3R) at the axially inner end being in the range of 40 to 55 degrees with respect to the tire equator (CO), the central lateral grooves (g3L) on one side of the tire equator being circumferentially shifted from the central lateral grooves (g2R) on the other side of the tire equator, between both sides of each inner main groove (G2), the middle lateral grooves (g2L, g2R) being shifted from the central lateral grooves (g3L, g3R) towards a circumferential direction (D), between both sides of each outer main groove (G1), the shoulder lateral grooves (g1L, g1R) being shifted from the middle lateral grooves (g2L, g2R) towards the circumferential direction (D), the circumferential shifts (LS1) between the shoulder lateral grooves (g1L, g1R) and the middle lateral grooves (g2L, g2R) being 0.2 to 0.3 times the mean circumferential pitch length PM of the lateral grooves (g1L, g1R, g2L, g2R, g3L and g3R), the circumferential shifts (LS2) between the middle lateral grooves (g2L, g2R) and the central lateral grooves (g3L, g3R) being 0.3 to 0.5 times the mean circumferential pitch length PM, the circumferential shifts (LS3) between the central lateral grooves (g3L) on one side of the tire equator and the central lateral grooves (g3R) on the other side of the tire equator being 0.25 to 0.5 times the mean circumferential pitch length PM, wherein said circumferential shifts between the shoulder lateral grooves and the middle lateral grooves and between the middle lateral grooves and the central lateral grooves (LS1 and LS2) are defined as the circumferential distance between a lateral groove end opened at the axially inner groove wall of each main groove and a nearest lateral groove end opened at the axially outer groove wall of the same main groove, measured from the center line to the center line of those lateral grooves, said circumferential shifts between the central lateral grooves on one side of the tire equator and the central lateral grooves on the other side of the tire equator (LS3) are defined as the circumferential distance between the terminal end of each central lateral groove (g3L) on one side and the terminal end of the nearest central lateral groove (g3R) on the other side measured from the groove center line to the groove center line, said mean pitch length PM is defined as the whole circumferential length (L) of the tire measured around the tire equator (CO) divided by the number (NP) of the pitches of the lateral grooves, in a state that the tire is mounted on its regular rim and inflated to its regular inner pressure and loaded with its regular tire load, the quotient (WG/W) of the total (WG) of the axial widths (WG1, WG2) of the four main grooves (G1 and G2) divided by the ground contact width (W) measured between the axial edges (SE) of the ground contacting area (S) being in the range of 0.25 to 0.32, on each side of the tire equator, the ground contact width (W) and the total (LG1+LG2) of the axial length (LG1) measured from the ground contacting area edge (SE) to the axially inner edge of the shoulder rib (RS) and the axial length (LG2) measured from the ground contacting area edge (SE) to axially inner edge of the middle rim (RM) satisfying the following relation:

$$0.44 \leq (LG1+LG2)/W \leq 0.50, \text{ and}$$

the angle $\theta 2$ is larger than the angle $\theta 3$.

8. The pneumatic radial tire according to claim 7, wherein the groove width of the shoulder lateral grooves (g1L, g1R) is in the range of 0.25 to 0.55 times the width (WG1) of the outer main groove (G1), and the groove width of the middle lateral grooves (g2L, g2R) is in the range of 0.25 to 0.50 times the width (WG2) of the inner main groove (G2).

9. The pneumatic radial tire according to claim 7, wherein the groove width of the shoulder lateral grooves (g1L, g1R) is larger than the groove width of the middle lateral grooves (g2L, g2R).

10. The pneumatic radial tire according to claim 7, wherein each of the lateral grooves (g1L, g1R, g2L, g2R, g3L and g3R) has a constant groove width.

11. The pneumatic radial tire according to claim 7, wherein each of the lateral grooves (g1L, g1R, g2L, g2R, g3L and g3R) has a groove width increasing gradually from the axially inner edge to the outer edge thereof.

12. The pneumatic tire according to claim 7, wherein the inner end of each of the central lateral grooves (g3L, g3R) on each side of the tire equator terminate axially outward from the tire equator.

13. The pneumatic tire according to claim 7, wherein on each side of the tire equator, the ground contact width (W) and the difference (LG2−LG1) of the axial length (LG2) measured from the ground contacting area edge (SE) to the axially inner edge of the middle rib (RM) minus the axial length (LG1) measured from the ground contacting area edge (SE) to the axially inner edge of the shoulder rib (RS) satisfy the following relation:

$$0.21 \leq (LG2-LG1)/W \leq 0.27.$$

* * * * *